Sept. 20, 1966  V. J. BRYANT  3,273,463
WORK FIXTURE TABLES FOR BROACHING MACHINES
Filed May 7, 1964  4 Sheets-Sheet 1

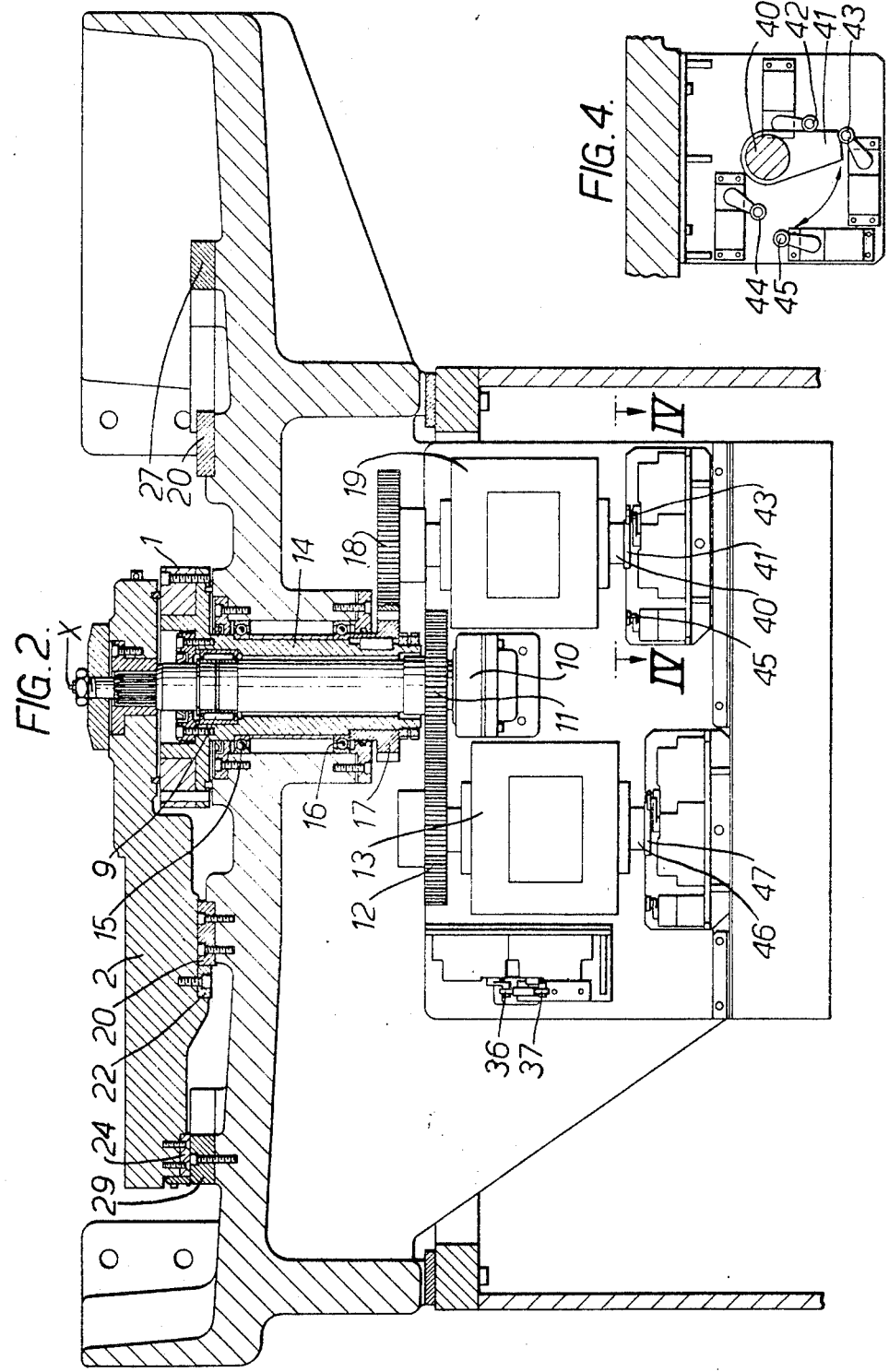

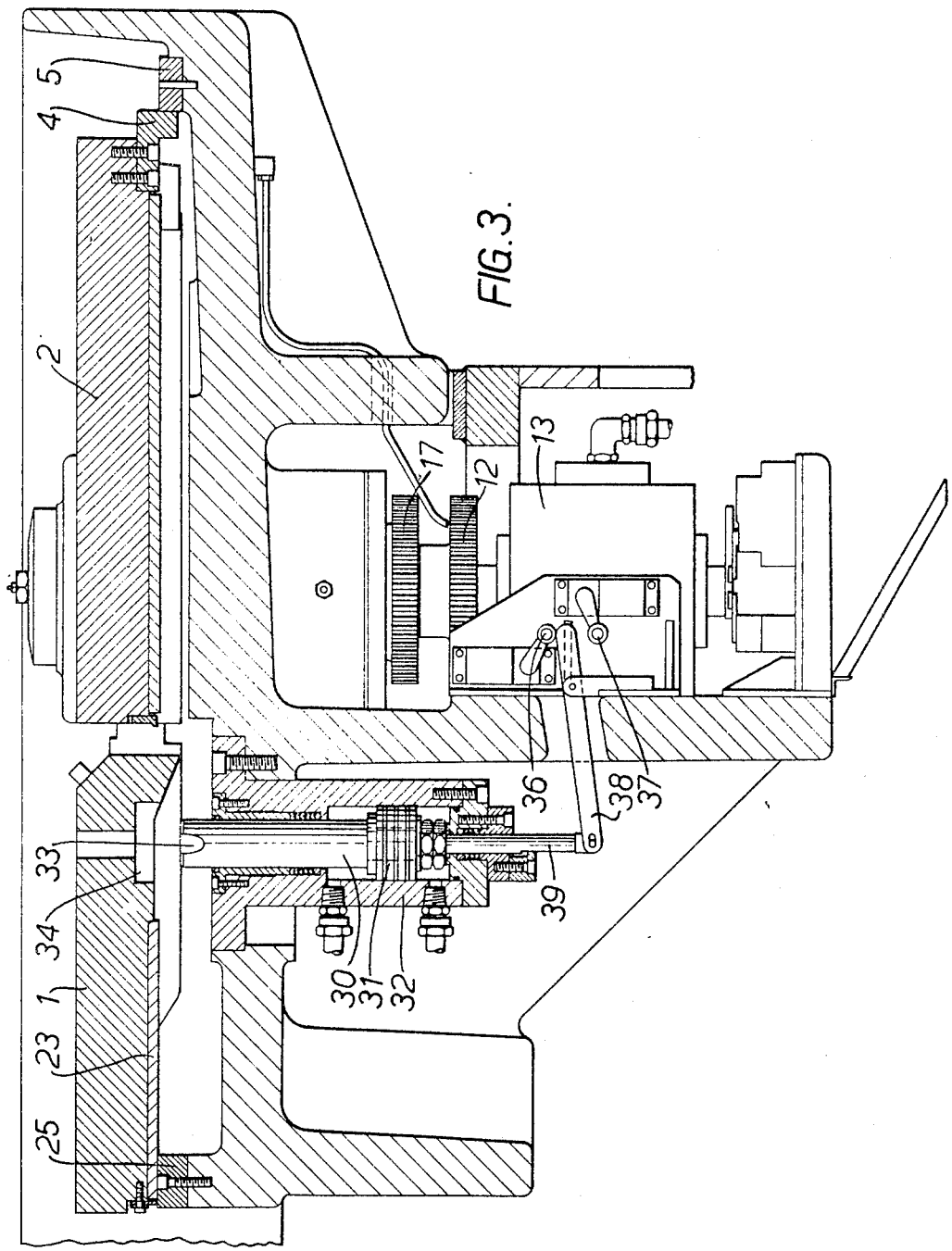

Sept. 20, 1966  V. J. BRYANT  3,273,463
WORK FIXTURE TABLES FOR BROACHING MACHINES
Filed May 7, 1964  4 Sheets-Sheet 4

United States Patent Office 3,273,463
Patented Sept. 20, 1966

3,273,463
WORK FIXTURE TABLES FOR BROACHING
MACHINES
Victor James Bryant, 132 Westfield Ave.,
Watford, England
Filed May 7, 1964, Ser. No. 365,684
Claims priority, application Great Britain, May 7, 1963,
17,974/63
14 Claims. (Cl. 90—89)

This invention relates to work fixture tables for broaching machines of the kind employing a single reciprocating main slide carrying the broach body and tools. On such machines it is usual practice to mount the work in a fixture carried by a movable table. The movement of the table is synchronised with the movement of the slide so as to bring the work into the path of the tools ready for the cutting stroke and then to take it out of the path of the tools before the return stroke. The table may move rectilinearly to approach the tool slide from the front or from one side. Alternatively, an arrangement is known wherein the table tilts or pivots about a horizontal axis parallel to the face of the slide. With these known arrangements, the loading and unloading of the work can only take place during the return stroke of the slide. In order to cut down the overall cycle time of the machine it is usual to return the slide at about twice the speed at which it moves during the cutting stroke. It will be appreciated that the resulting reduction of the time taken for the return stroke also reduces the time available for loading and unloading of the work.

Indexing fixtures are also known which index the work into position while the table is restricted during the return stroke. With this arrangement, the work can be loaded and unloaded during the cutting stroke, so affording a larger proportion of cycle time for these operations. However, with increasing complexity of components and increased ram speeds, it has been found that even the time taken during the cutting stroke is insufficient for loading and unloading.

It is the principal object of the present invention to provide a broaching machine in which virtually the whole cycle time (cutting and return stroke) may be utilised for loading and unloading.

According to the invention there is provided a broaching machine comprising a single tool slide and a pair of movable work tables each independently capable of movement between a respective loading position and a common working position whereby tools on the slide can act on the work carried by each work table in turn while the opposite work table is being loaded and unloaded as it remains in its loading position during the cutting and return stroke of the slide.

Figure 1:
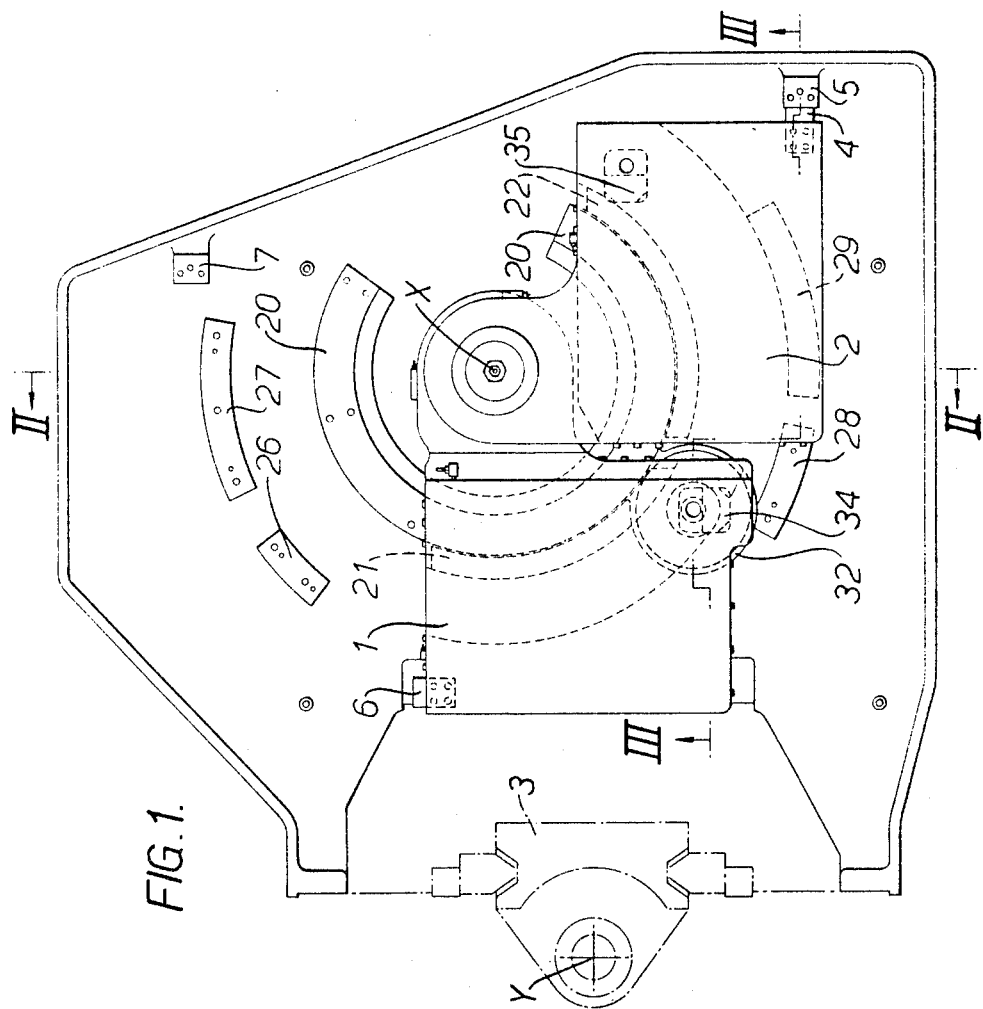
Figure 5:
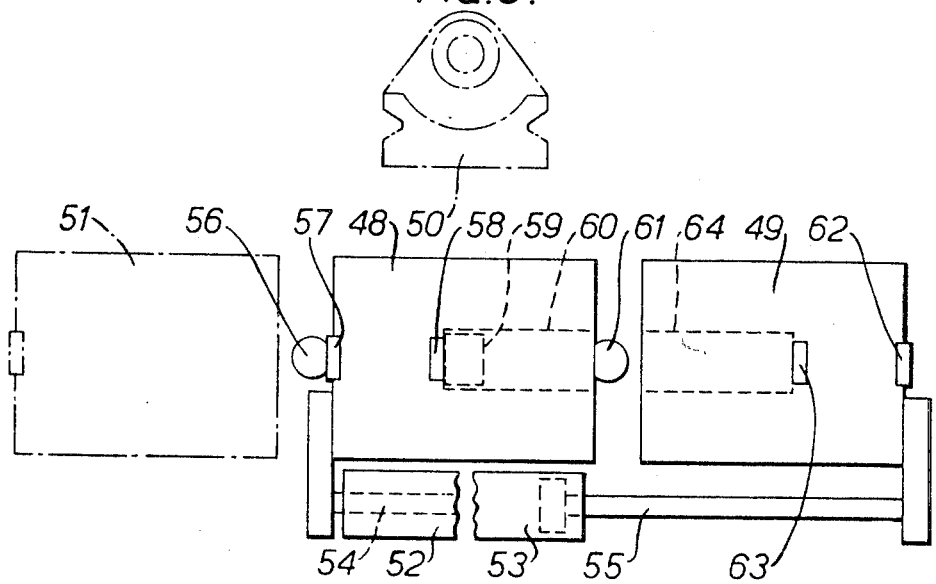
Figure 6:
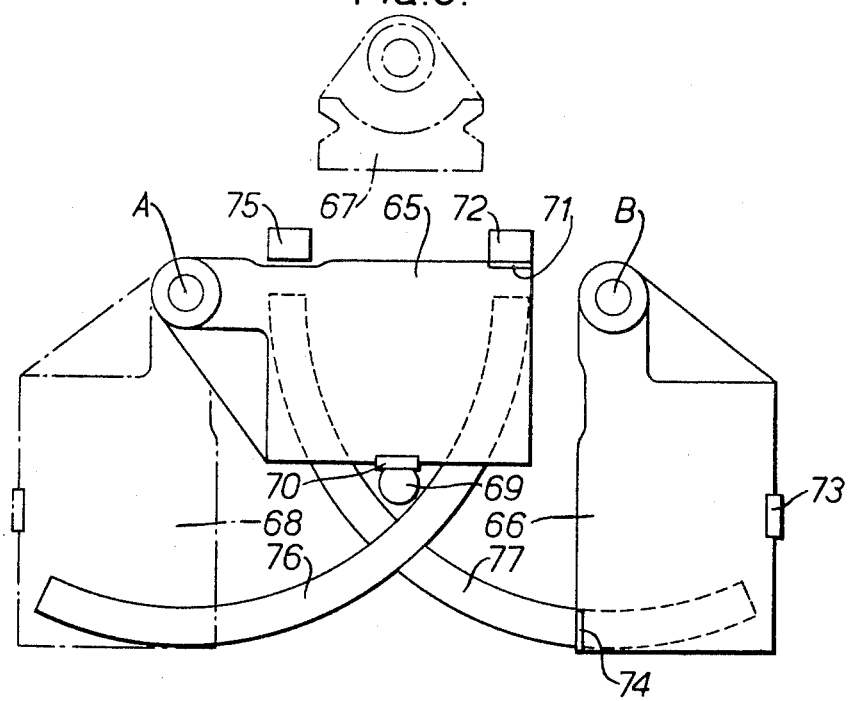

Three embodiments of the invention will be described by way of example with reference to the accompanying drawings, wherein:

FIG. 1 is a plan view of the work tables of a broaching machine in accordance with the first embodiment,
FIG. 2 is a section on the line II—II of FIG. 1,
FIG. 3 is a section on the line III—III of FIG. 1,
FIG. 4 is a fragmentary section on the line IV—IV of FIG. 2,
FIG. 5 is a diagrammatic plan view of the work tables of a broaching machine in accordance with the second embodiment, and
FIG. 6 is a diagrammatic plan view of the work tables of a broaching machine in accordance with the third embodiment.

Referring to FIG. 1, there are shown two work tables 1 and 2 mounted on a suitable support for independent angular movement about a common axis X. Each table has a respective loading position and both tables have a common working position. As shown, table 1 is in the working position wherein work carried thereby can be operated on by broaches carried by the reciprocating tool slide 3. Table 2 is shown in its loading (and unloading) position wherein a stop block 4 abuts against a fixed stop 5. Although for special purposes the vertical axis Y of the tool slide 3 may be offset from the rotation axis X of the work tables as shown, it is to be understood, that the two axes may equally well be aligned in more normal applications.

After the work has been broached, the table 1 is rotated through a right angle about the axis X until the stop block 6 abuts against a fixed stop 7. The table 1 is now in its loading (and unloading) position and the slide 3 is now free to return. Only after the slide has returned, is the table 2 rotated through a right angle to bring it into the working position in front of the slide.

Referring now to FIG. 2, there is shown the means for independently moving the tables about the axis X. The table 2 is fixed to a spindle 8 journalled in upper and lower bearings 9 and 10. A gear wheel 11 fixed to the spindle 8 meshes with a gear wheel 12 driven by a hydraulic actuator 13 of the paddle type. The table 1 is fixed to a hollow spindle or sleeve 14 co-axially surrounding the spindle 8. The sleeve 14 is itself rotatable in upper and lower bearings 15 and 16 and carries the outer race of the upper bearing 9 of the spindle 8. It will be apparent that either spindle 8 or sleeve 14 can rotate independently of the other and thus move its associated table. The sleeve 14 has fixed thereto a gear wheel 17 meshing with a gear wheel 18 driven by a second hydraulic actuator 19 similar to actuator 13.

Referring to FIGS. 1, 2 and 3, both tables are guided for rotary movement by a fixed arcuate guide 20 with which co-operate sliding arcuate guides 21 and 22 fixed respectively to the tables 1 and 2. Under each table is fixed a respective bearing plate 23 and 24 which, in the working position of the table, contacts a register plate 25 in front of the slide 3. The plate 25 thus takes the thrust as the broach is operated by the descending tool slide. As the table 1 moves to and from its loading position, the plate 23 passes over scraper plates 26 and 27 which scrape it clean of any swarf or other matter adhering to its under surface. The plates 26 and 27 also serve to support the table 1 in its loading position. Scraper plates 28 and 29 perform similar functions for table 2.

In order to lock the appropriate table in the working position, a locking member in the form of a plunger 30 is provided as shown in FIG. 3. This plunger forms the piston rod of a hydraulic ram 31 reciprocable in a vertically disposed cylinder 32. The upper end of the plunger 30 is formed with chamfered surfaces on either side, of which one is shown at 33 in FIG. 3. In the position shown in FIG. 3, the plunger is lowered and is about to be inserted into a locking recess 34 in table 1. As indicated diagrammatically in FIG. 1, one side of the recess 34 is of similar contour to the chamfer 33 on the plunger 30 and when the plunger enters the recess the two sloping surfaces interact to produce a wedging action which finally locates the table in position. A similar chamfer on the opposite side of the head of the plunger 30 co-operates in a similar manner with a locking recess 35 in the table 2 when the latter has been rotated into the working position.

It will be appreciated that the operation of the hydraulic actuators 13 and 19 and of the hydraulic ram for the locking plunger 30 may be controlled by electrically-operated valves connected in a control circuit incorporating the usual safeguards and interlocks. Thus, means is provided in the form of limit switches 36 and 37 to record the position of the locking plunger 30. In the unlocked position shown, a lever 38 linked to an extension 39 of the plunger, operates the limit switch 36, while in the locked position the lever operates the limit switch 37. These switches ensure that the respective table is locked before broaching begins and unlocked before any attempt is made to move it after broaching.

As shown in FIG. 4, the hydraulic actuator 19 is provided with an extension 40 carrying an arm 41. This arm operates two limit switches 42 and 43 to stop the actuator 19 when the table 1 is in working position and to cause the operation of the locking plunger 30 to lock the table. When the table 1 is rotated to its loading position, the arm 41 operates a second pair of limit switches 44 and 45. These cause the actuator 19 to be stopped and indicate that the tool slide may perform its return stroke. An extension 46 from actuator 13 carries an arm 47 arranged to act on a set of four limit switches disposed similarly to switches 42 to 45 in FIG. 4.

Turning to the second embodiment which has only been illustrated diagrammatically in FIG. 5, two tables are shown at 48 and 49, table 48 being in working position in front of the tool slide 50. Table 49 is in its loading position while the loading position for table 48 is shown in dotted lines at 51. As in the first embodiment, each table is movable independently of the other although the movement is rectilinear and not angular. The means for moving the tables comprises a pair of hydraulic rams in cylinders 52 and 53. These cylinders are disposed one above the other and the tables are moved by means of respective piston rods, 54 and 55. The table 48 is locked in the working position by means of a locking plunger 56 having a chamfered or wedge-shaped end engaging a locking surface 57 fixed to the table. This forces a second locking surface 58 on the table into contact with a fixed block 59. A clearance slot 60 is provided under the table 48 to allow the latter to pass over the top of the block 59. In the working position of the table 49, a second locking plunger 61 acts on a locking surface 62 to force a locking surface 63 into contact with the opposite (i.e. right hand) face of the block 59, the latter being accessible through a clearance slot 64.

In the third embodiment, shown diagrammatically in FIG. 6, both tables are assumed to be movable independently through a right angle by hydraulic actuators similar to those described in relation to FIGS. 1 to 4. However, in this case, the two tables 65 and 66 are rotatable about separate axes A and B. As shown, table 65 is in the working position in front of the tool slide 67 while table 66 is in its loading position. The loading position for table 65 is shown dotted at 68. The table 65 is locked in the working position by means of a locking plunger 69 having a chamfered or wedge-shaped end engaging a locking surface 70 fixed to the table. This forces a second locking surface 71 into contact with a fixed block 72. In the working position of the table 66 the plunger 69 engages a locking surface 73 and forces a second locking surface 74 into contact with a second fixed block 75. As each table moves between its extreme positions it passes over arcuate scraping and register plates indicated diagrammatically at 76 and 77 respectively.

Although in the embodiments described it has been assumed that the tables are moved hydraulically, it is to be understood that they could also be moved electrically and the word actuator in the ensuing claims is to be taken as including an electrically driven actuating device.

What I claim is:

1. A broaching machine comprising a single tool slide and a pair of movable work tables each independently capable of movement between a respective loading position and a common working position whereby tools on the slide can act on the work carried by each work table in turn while the opposite work table is being loaded and unloaded as it remains in its loading position during the cutting and return stroke of the slide.

2. A machine as claimed in claim 1 in which the two tables are mounted for independent angular movement between said positions by means of individual rotary actuators and in which means independent of said actuators is provided for locking either table in the working position.

3. A machine as claimed in claim 2 in which the two tables are mounted respectively on co-axial shafts for independent angular movement about a common axis.

4. A machine as claimed in claim 1 in which the two tables are mounted for independent rectilinear movement between said positions by means of independent reciprocatory actuators and in which means independent of said actuator is provided for locking either table in the working position.

5. A machine as claimed in claim 2 in which said locking means comprises a reciprocable locking plunger having at least one chamfered end adapted to exert a wedging action against a surface on the table in order to locate the table in its final working position.

6. A machine as claimed in claim 4 in which said locking means comprises a reciprocable locking plunger having at least one chamfered end adapted to exert a wedging action against a surface on the table in order to locate the table in its final working position.

7. A machine as claimed in claim 1 further comprising a support, and a pair of parallel spindles each secured to one of the tables and each mounted for rotation in the support, whereby the tables are independently angularly movable about the axes of their respective spindles.

8. A machine as claimed in claim 7 in which one of the spindles is hollow and coaxially surrounds the other of the spindles, whereby each table has the same axis of rotation.

9. A machine as claimed in claim 7 further comprising a pair of independent rotary actuators secured to the support, each actuator being coupled to one of the spindles for independent rotation of the tables between working and loading positions.

10. A machine as claimed in claim 9 further comprising independent control means cooperating with each actuator for stopping the actuator when the table is in the angular position corresponding to the loading position and working position.

11. A machine as claimed in claim 7 further comprising a register plate secured to the support at the common working position of the tables, and a pair of bearing plates each secured to one of the tables for contact with the register plate when the table is in working position.

12. A machine as claimed in claim 11 further comprising scraper plates secured to the support for cleaning the bearing plates as they move with the tables.

13. A machine as claimed in claim 7 further comprising a plunger slidably mounted on the support and having a chamfered end, wedging surface means provided on each table for receiving the end of the plunger, the surface means being located so as to be in a position to contact the end of the plunger when the table is in working position, and means for sliding the plunger end into contact with the surface means.

14. A machine as claimed in claim 13 further comprising control means cooperating with each spindle for actuating the sliding means when either spindle is in an angular position corresponding to the working position of the table to which it is fixed.

References Cited by the Examiner
UNITED STATES PATENTS

| | | | |
|---|---|---|---|
| 2,002,924 | 5/1935 | Romaine et al. | 90/65 |
| 2,043,420 | 6/1936 | Roehm | 90—85 X |
| 2,072,563 | 3/1937 | Lynch et al. | 90—73 |
| 2,148,241 | 2/1939 | Lapointe | 90—85 |
| 2,239,237 | 4/1941 | Lapointe | 90—85 X |
| 2,813,462 | 11/1957 | Bonnafe | 90—85 |

WILLIAM W. DYER, Jr., *Primary Examiner.*

L. VLACHOS, *Assistant Examiner.*